Dec. 25, 1962          H. H. LUND ETAL          3,070,110
CONSISTENCY MEASURING AND CONTROL SYSTEM
Filed July 8, 1957          4 Sheets-Sheet 1
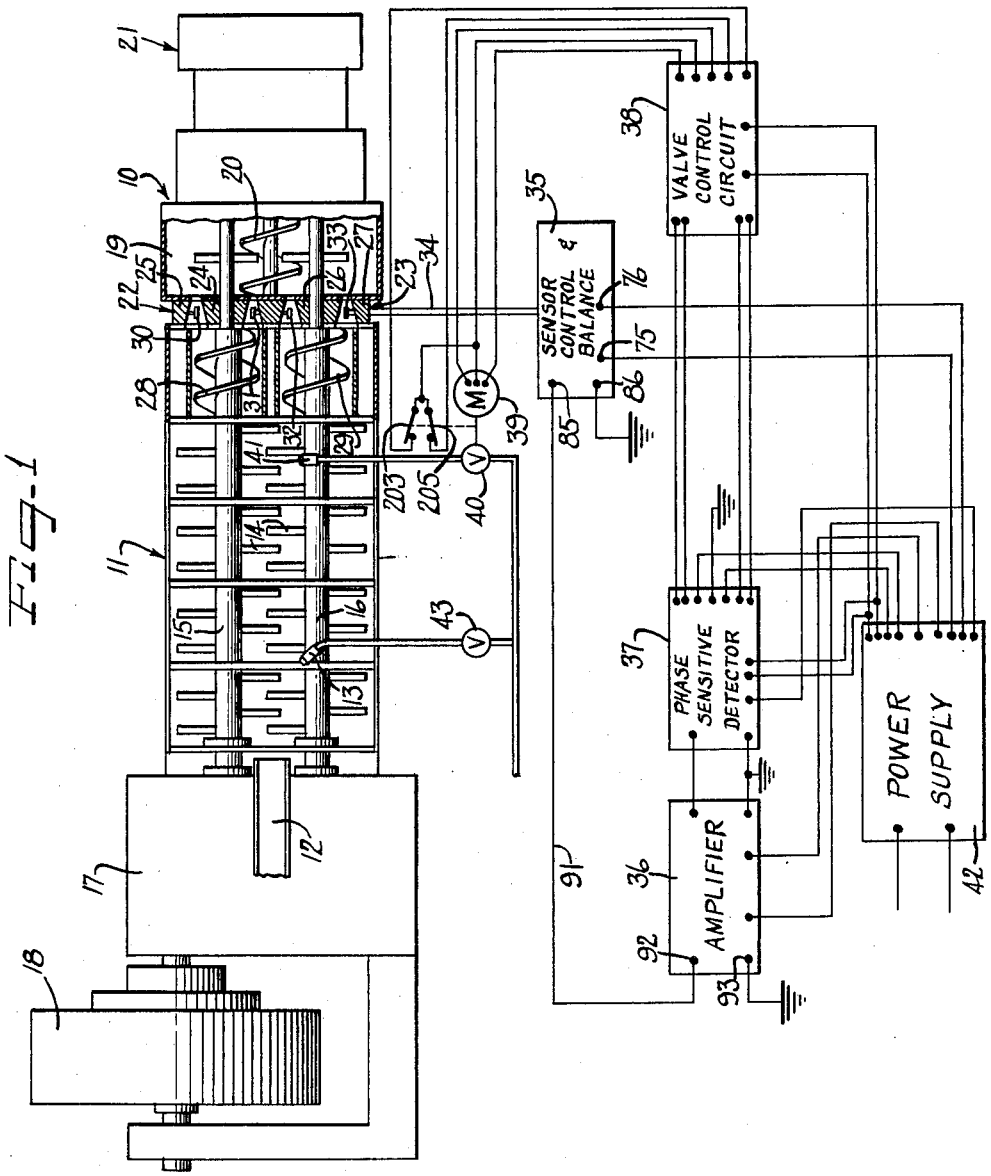
Inventors
H. Howard Lund
Marvin B. Levine

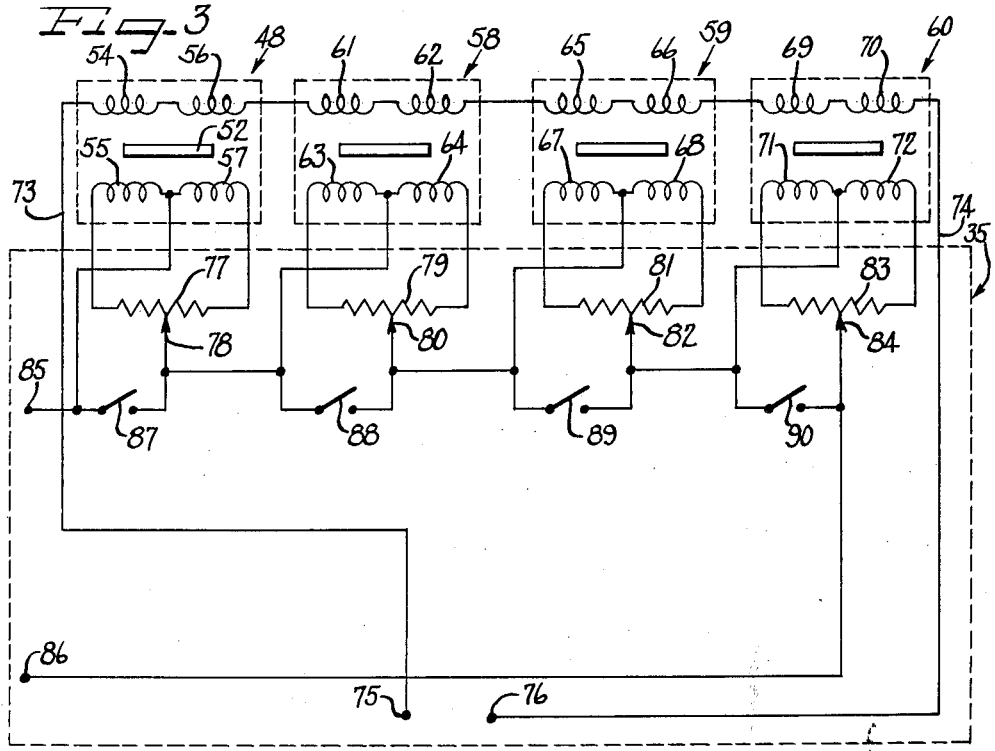

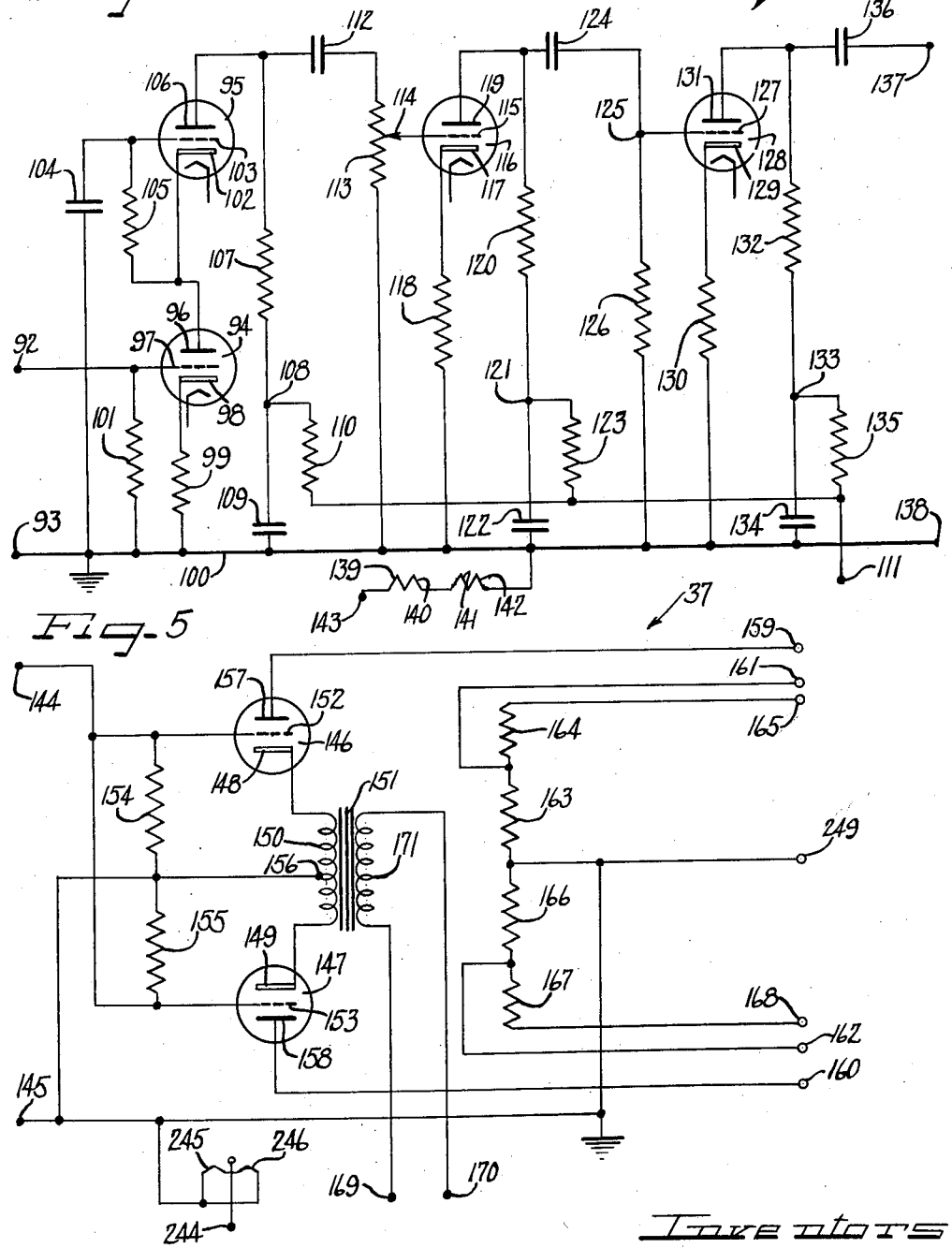

Dec. 25, 1962 H. H. LUND ETAL 3,070,110
CONSISTENCY MEASURING AND CONTROL SYSTEM
Filed July 8, 1957 4 Sheets-Sheet 4
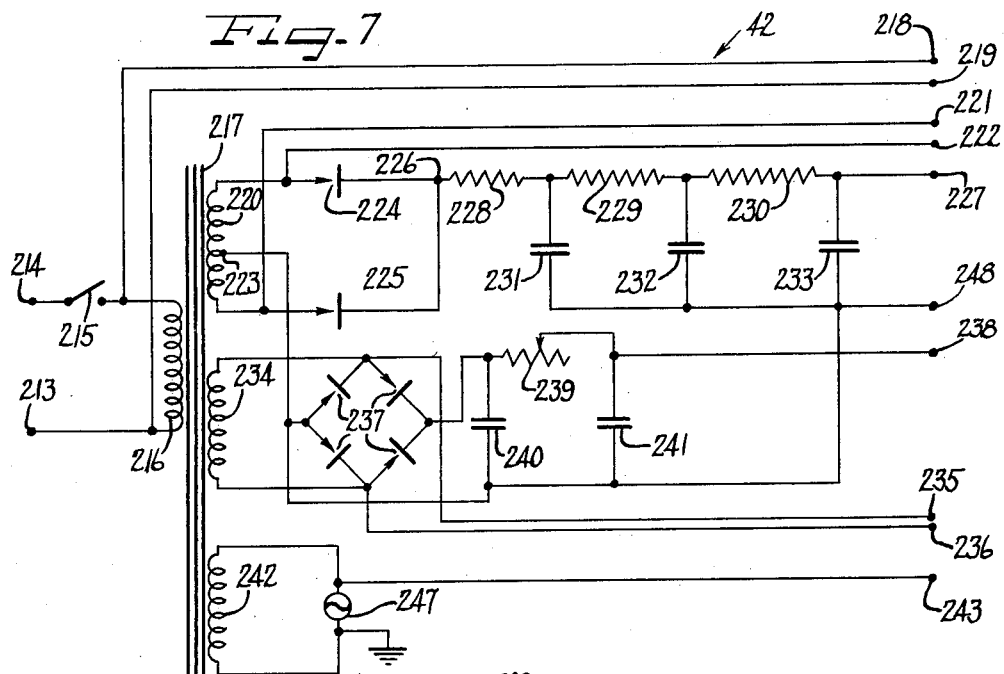
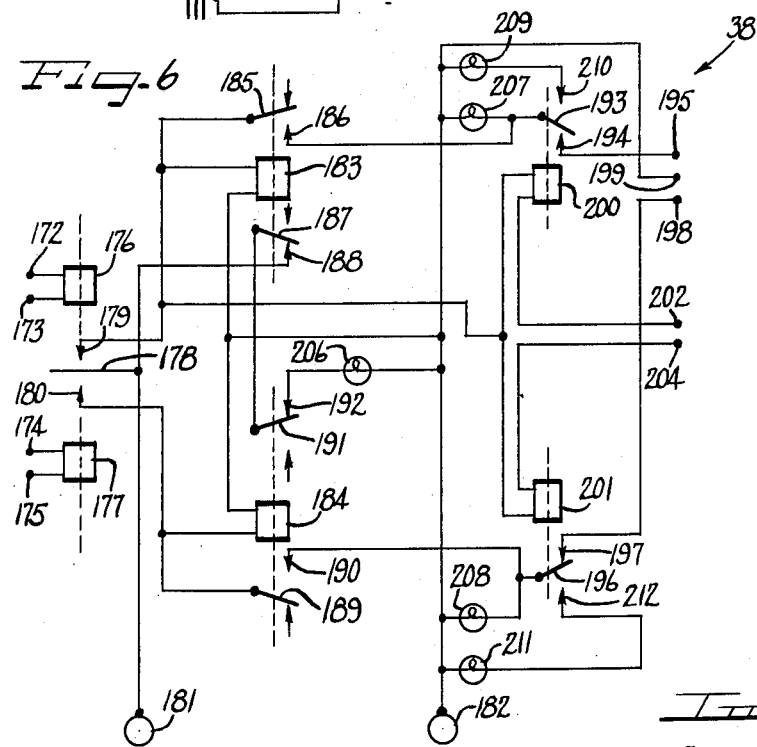
Inventors
H. Howard Lund
Marvin B. Levine
Attys

United States Patent Office 3,070,110
Patented Dec. 25, 1962

3,070,110
CONSISTENCY MEASURING AND
CONTROL SYSTEM
H. Howard Lund, Palatine, and Marvin B. Levine, Chicago, Ill., assignors, by mesne assignments, to National Clay Pipe Research Corporation, Crystal Lake, Ill., a corporation of Ohio
Filed July 8, 1957, Ser. No. 670,466
14 Claims. (Cl. 137—92)

This invention relates to the testing and processing of materials in which the consistency is an important factor. In the manufacture of clay brick, tile or pipe, for example, the consistency required to obtain proper formation of the articles is quite critical and very slight variations in the consistency will result in wide variations in the dimensions and quality of finished articles.

Systems have heretofore been proposed for measuring the moisture content of a sample, or for measuring the amount of pressure required to compress a sample to a predetermined extent. Such systems do not provide an accurate indication of consistency, in that they are affected by variations in properties other than consistency. For example, two samples of clay may have the same moisture content, or may require the same pressure to compress them to a predetermined extent, and yet the consistencies of the samples may be substantially different, usually due to the presence of organic materials. In addition, such systems are not adaptable to any automatic control arrangements.

As a consequence, it has heretofore been the practice to measure the consistency of clay by feel, even though the accuracy obtained is very poor with even the most skillful of operators.

It is therefore an object of this invention to provide a method and apparatus for accurately and reliably measuring consistency.

Another object of this invention is to provide a system for processing a material in which the consistency is automatically controlled.

According to this invention, the consistency of a material is measured by the very simple expedient of extending a feeler into the material, effecting relative movement of the material to cause it to move past the feeler, and measuring the force exerted on the feeler. It has been demonstrated that this system provides a highly accurate and reliable measurement of consistency.

A further feature of the invention resides in the control of the consistency of a material from the measurements obtained, to provide an automatic control which is especially advantageous in continuous processing systems.

Additional features of the invention reside in the specific construction in operation of consistency sensor elements and in the construction and operation of an automatic control system.

It may here be noted that this invention may be applied to the testing or processing of any material in which the consistency is an important factor. In addition to clay, it may be used in plastics and rubber formation equipment and in the manufacture of some food products and household articles, such as candy, soap and associated items. Such materials are herein referred to generically as moldable materials.

This invention contemplates other and more specific objects, features and advantages which will become more fully apparent from the following detailed description taken in conjunction with the accompanying drawings which illustrate preferred embodiments and in which:

FIGURE 1 is a top plan view, partly in section, of a clay processing machine utilizing a consistency measuring and control system constructed according to the principles of this invention, the measuring and control system being illustrated diagrammatically;

FIGURE 2 is a detail view of a preferred form of consistency sensor device used in the system of FIGURE 1;

FIGURE 3 is a schematic electrical diagram illustrating a sensor control and balance circuit, and the interconnection of the sensor device of the system of FIGURE 1;

FIGURE 4 is a schematic electrical diagram of an amplifier of the control system of FIGURE 1;

FIGURE 5 is a schematic electrical diagram of a phase sensitive detector of the control system of FIGURE 1;

FIGURE 6 is a schematic electrical diagram of a valve control circuit used in the control system of FIGURE 1; and FIGURE 7 is a schematic electrical diagram of a power supply circuit used in the control system of FIGURE 1.

Reference numeral 10 generally designates a clay processing machine to which the consistency testing and control system of this invention is applied. The machine 10 comprises a pug mill 11 into which clay is introduced from a chute 12 with water being introduced from a spray nozzle 13. The clay and water are thoroughly mixed in the pug mill by means of knives 14 on parallel shafts 15 and 16 which are driven through a gear box from a pulley 18 which may be connected to a motive power source.

The mixed clay is transferred from the pug mill to a vacuum chamber 19 maintained at a sub-atmospheric pressure to remove entrapped air. An auger 20 feeds the clay from the vacuum chamber 19 out through an extrusion die 21 to form bricks, tile, pipe or whatever form is desired.

In order to insure a seal to the vacuum chamber 19, the clay is forced through a pair of sealing dies 22 and 23. The sealing die 22 comprises inner and outer rings 24 and 25 having facing generally conical surface portions in generally convergent relation to define annular orifices of gradually decreasing cross-sectional area, the inner ring 24 being secured to the shaft 15 and the outer ring 22 being fixed to the machine housing. The sealing die 23 similarly comprises an inner ring 26 secured to the shaft 16 and a fixed outer ring 27. A pair of augers 28 and 29 are respectively secured to the shafts 15 and 16 to feed the clay from the pug mill through the sealing dies 22 and 23 into the vacuum chamber 19.

According to this invention, means are provided for meausring the consistency of the clay and in the illustrated embodiment, such means comprises sensor devices 30, 31, 32 and 33 located in the path of flow through the sealing dies 22 and 23, the devices 30 and 31 being located in the annular passage of the die 22 on opposite sides of the axis thereof and the devices 32 and 33 being located in the annular passage of the die 23 on opposite sides of the axis thereof.

The sensor devices 30–33 are arranged to develop electrical output signals and are connected through a cable 34 to a sensor control and balance circuit 35 shown in block form in FIGURE 1 and in detail in FIGURE 3. The output of the sensor control and balance circuit 35 is connected to the input of an amplifier 36 having an output connected to a phase sensitive detector 37 which is connected to a valve control circuit 30 to control the energization of a motor 39 which controls a valve 40. The valve 40 controls the flow of water to a nozzle 41 which sprays the water into the pug mill 11. A power supply circuit 42 is provided to supply energization to the circuits above described.

In the operation of this system, the sensor devices 30–33 respond to changes in the consistency of the clay and the signal developed by the sensor devices is used to control the valve 40 to control supply of water through the nozzle 41 in such a manner as to maintain a substantially constant consistency of the clay.

It may be noted that the motor-controlled valve 40 could be used to supply all of the water to the pug mill but it is preferred to supply the main portion of the water through a manually adjustable valve 43 connected to the nozzle 13, and to use the motor-controlled valve 40 to supply only a relatively small portion of the water. The valve 43 might, for example, be adjusted to supply 98% of the water normally required and the valve 40 when half open might supply 2% of the water normally required. It will thus be appreciated that a very accurate control of consistency can be maintained.

It should further be noted that the position of the nozzle 41 is somewhat critical and in particular, if it is located too close to the sensor devices, the water may not be properly mixed into the clay to produce an accurate measurement, while if the nozzle 41 is located too far away there will be an undesirable time lag in the system. The nozzle 41 is preferably so located that there are about two of the knives 14 between it and the sealing augers 28, 29.

It may here be noted that only one of the sensor devices 30–33 is required to measure consistency. However, a plurality of the devices are preferably placed at spaced points and are so connected electrically to obtain an averaging action. It is additionally advantageous to dispose pairs of the devices on opposite sides of the axis of the sealing dies to minimize the effect of cyclic variations of the velocity of flow caused by the action of the sealing augers.

The construction of all of the illustrated sensor devices 30–33 is the same, the construction of the device 30 being illustrated in detail in FIGURE 2. Referring thereto, the device 30 comprises a sleeve 42 which is supported in the annular passage of the die 22 with its axis parallel to the direction of flow, the sleeve 42 being supported from the outer ring 25 by means of a transverse post 43 which may be integrally secured to the sleeve 42. The post 43 may have a hydrodynamic streamlined cross-sectional shape to minimize resistance to flow.

A feeler 44 is telescopically mounted in the sleeve 42 and has a forward end portion projecting from the forward or upstream end of the sleeve 42 into the path of flow of the clay. The end portion 45 is preferably tapered smoothly down to a generally pointed terminal end, to obtain a smooth laminar or non-turbulent flow of the clay therearound.

It will be appreciated that as the consistency of the clay increases, the rearward force or thrust exerted on the feeler 44 will be increased. This force serves as a measure of the consistency of the clay.

In the illustrated embodiment, the force exerted on the feeler 44 is measured by urging the feeler 44 forwardly with a force increasing with rearward displacement, and measuring the displacement of the feeler 44. In particular, a coiled compression spring 46 is disposed within the sleeve 42 between the rearward side of the feeler 44 and an annular abutment 47 extending radially inwardly from the inner wall of the sleeve 42. To measure the displacement, the differential transformer 48 is provided which comprises a pair of sections 49 and 50 in axially spaced relation within the sleeve 42, each of the sections 49 and 50 comprising primary and secondary coils. These coils are connected to a measuring and control circuit to be described through leads 51 which extend through an opening in the support post 43. An armature or core 52 is movable within the transformer sections 49 and 50 and is connected to the feeler 44 by means of a stem 53.

Referring to FIGURE 3, the transformer section 49 may comprise a primary winding 54 and a secondary winding 55 while the transformer section 50 comprises a primary winding 56 and a secondary winding 57. The primary windings 54 and 56 are connected to a source of alternating current while the secondary windings 55 and 57 are connected to a comparison circuit. In operation, if the feeler 44 should move rearwardly due to an increase in the consistency of the clay, the mutual magnetic coupling between the windings 54 and 55 will be decreased while the mutual magnetic coupling between the windings 56 and 57 will be increased. Thus the output of the transformer section 49 will be decreased while the output of the transformer section 50 is increased. These outputs are compared and measured to determine the consistency.

As above indicated, the construction of the illustrated sensor devices 30–33 is the same, and the sensor devices 31, 32 and 33 respectively include differential transformers 58, 59 and 60 shown in the schematic electrical diagram of FIGURE 3. The differential transformer 58 comprises a pair of primary windings 61 and 62 which are respectively coupled to secondary windings 63 and 64; the differential transformer 59 comprises a pair of primary windings 65 and 66 respectively coupled to secondary windings 67 and 68; and the differential transformer 60 comprises a pair of primary windings 69 and 70 respectively coupled to secondary windings 71 and 72.

All of the differential transformer primary windings are connected in series, the series circuit being connected by means of conductors 73 and 74 to terminals 75 and 76 of the sensor control and balance circuit 35, the terminals 75 and 76 being connected to a source of alternating current as will be described.

The secondary windings 55 and 57 of the differential transformer 48 are connected in series and to the end terminals of a potentiometer 77 having a movable contact 78. The output voltage of this circuit is developed between the movable contact 78 and the junction between secondary windings 55 and 57 are connected in phase opposition and in a certain position of the core or armature 52, the output voltage will be zero. With movement in one direction away from the null position of the core 52, an output voltage of one phase will be developed while the movement in the opposite direction, an output voltage of the opposite phase will be developed. The null position may be adjusted by adjustment of the movable contact 78.

The connections for the transformers 58–60 are the same as for the transformer 48. In particular, the secondaries 63 and 64 are connected in series to a potentiometer 79 having a movable contact 80; the secondaries 67 and 68 are connected in series to a potentiometer 81 having a movable contact 82; and the secondaries 71 and 72 are connected in series to a potentiometer 83 having a movable contact 84. The output voltages developed by the differential transformer circuits are connected in series to a pair of terminals 85 and 86. In particular, the terminal 85 is connected to the junction between secondary windings 55 and 57; the movable contact 78 is connected to the junction between secondary windings 63 and 64; the movable contact 80 is connected to the junction between secondary windings 67 and 68; the movable contact 82 is connected between the junction between secondary windings 71 and 72; and the movable contact 84 is connected to the terminal 86.

It will be appreciated that a voltage is developed between the terminals 85 and 86 which corresponds in phase and magnitude to the deviation in the average consistency of the clay moving past the sensor devices 30–33 from a certain value as determined by the adjustments of movable contacts 78, 80, 82 and 84.

In order to permit adjustment of the circuit, switches 87, 88, 89 and 90 are respectively connected across the outputs of the circuits corresponding to transformers 48, 58, 59 and 60. Thus to adjust the circuit for transformer 58, the switches 87, 89 and 90 may be closed.

The output terminal 85 of the sensor control and balance circuit 35 is connected through a conductor 91 to an input terminal 92 of the amplifier 36, the other output terminal 86 of the circuit 35 being connected to ground and a second input terminal 93 of the amplifier 36 being connected to ground.

Referring to FIGURE 4, the amplifier 36 has an input stage which comprises a pair of triodes 94 and 95 connected in a cascade circuit. In particular, the triode 94 has an anode or plate 96, a control grid 97 connected to the input terminal 92 and a cathode 98 connected through a bias resistor 99 to a ground bus connected to the input terminal 93. A grid resistor 101 is connected between the grid 97 and the ground bus 100. The triode 95 comprises a cathode 102 which is connected to the plate 96 of the triode 94, a grid 103 connected through a capacitor 104 to the ground bus 100 and through a resistor 105 to the cathode 102, and a plate 106 which is connected through a plate resistor 107 to a circuit point 108. The circuit point 108 is connected to the ground bus 100 through a filter capacitor 109 and through a decoupling resistor 110 to a B+ terminal 111 to which is applied a relatively high positive voltage with respect to ground.

In the operation of the input stage, as the potential of the input terminal 92 is changed in a positive direction relative to the potential of the input terminal 93, the conduction through the triode 94 will be increased which will tend to reduce the potential of the cathode 102 to thus increase the grid-cathode potential of the triode 95 and increase the conduction through the triode 95. Thus a greater change in the voltage across the resistor 107 will be obtained, as compared to the change in voltage which would be obtained if only a single triode were used in the input stage. This type of circuit is referred to as a cascade circuit and is characterized by high sensitivity and an extremely low noise level relative to gain. It is additionally advantageous in that it can be used with an input voltage source having a comparatively low impedance, such as is provided by the output of the sensor control balance circuit 35.

The plate 106 of the triode 95 is connected through a capacitor 112 to an end terminal of a potentiometer 113 the other terminal of which is connected to the ground bus 100. The potentiometer 113 has a movable contact 114 which is connected to the control grid 115 of a triode amplifier having a cathode 117 connected through a bias resistor 118 through the ground bus 100 and having a plate 119 connected through a load resistor 120 to a circuit point 121 which is connected through a filter capacitor 122 to ground and through a decoupling resistor 123 to the B+ terminal 111.

The plate 119 is further coupled through a capacitor 124 to a circuit point 125 which is connected through a resistor 126 to the ground bus 100 and which is directly connected to the control grid 127 of an amplifier triode 128 having a cathode 129 connected through a resistor 130 to the ground bus 100 and a plate 131 connected through a load resistor 132 to a circuit point 133. The circuit point 133 is connected through a filter capacitor 134 to the ground bus 100 and through a decoupling resistor 135 to the B+ terminal 111. The plate 131 is additionally coupled through a coupling capacitor 136 to an output terminal 137, a second output terminal 138 being connected to the ground bus 100.

It will be appreciated that the triodes 116 and 128 are thus connected in a more or less conventional resistance-capacitance coupled amplifier circuit. The gain of the amplifier 36 may, of course, be controlled by adjustment of the movable contact 114.

The triodes 94, 95, 116 and 128 respectively have heaters 139, 140, 141 and 142 which are connected in series between the ground bus 100 and a terminal 143. As will be described, the power supply 42 preferably is arranged to apply a direct current voltage between the terminal 143 and ground, although in some cases it may be all right to use an alternating current supply for heating the cathodes of the amplifier tubes. The triodes 94 and 95 may be in a common envelope and similarly, the triodes 116 and 128 may be in a common envelope.

The output terminals 137 and 138 of the amplifier 36 are respectively connected to input terminals 144 and 145 of the phase sensitive detector 37, the circuit of which is illustrated in FIGURE 5. The detector 37 comprises a pair of triodes 146 and 147 which have cathodes 148 and 149 connected to the end terminals of the secondary 150 of a transformer 151, grids 152 and 153 connected together and to the input terminal 144 and also through resistors 154 and 155 to the center tap 156 of the transformer secondary 150 which is also connected to the grounded input terminal 145, and plates 157 and 158 which are connected to output terminals 159 and 160.

The output terminals 159 and 160 are connected through relay coils of the valve control circuit to terminals 161 and 162, as will be described. The terminal 161 is connected through a resistor 163 to ground and also through a resistor 164 to a terminal 165, while the terminal 162 is connected through a resistor 166 to ground and also through a resistor to a terminal 168. Resistors 163, 164, 166, 167 provide a voltage divider to drop the voltage supply of winding 220 of transformer 217 to a more convenient level. For a transformer of a different rating, a voltage divider may or may not be necessary.

An alternating current supply is connected to the terminals 165 and 168 and an alternating current supply is also connected to terminals 169 and 170 which are connected to a primary winding 171 for the transformer 151. These alternating current supplies are derived from the power supply circuit 42 in a manner as will be described, and are of the same frequency and in fixed phase relation to each other and to the alternating current supplied to the primary windings of the differential transformers 48 and 58–61.

In operation, the voltage developed across the secondary winding 150 is in phase with the voltage applied to the terminals 165 and 168 to so bias the triodes 146 and 147 as to prevent substantial current conduction therethrough when no input voltage is applied. When an input voltage is applied to the terminals 144, 145 it will cause one or the other of the triodes 146, 147 to conduct, depending upon the phase relation of the input voltage to the voltage applied to terminals 165, 168. If, for example, the input voltage at the terminal 144 is positive when the voltage applied to terminal 165 is positive, it will cause the triode 146 to conduct and with a reversed phase relation, the triode 147 will conduct. The amount of conduction will, of course, be dependent upon the amplitude of the input signal.

The output terminals 159, 161, 162 and 160 are respectively connected to terminals 172, 173, 174 and 175 of the valve control circuit 38. A balance relay coil 176 is connected to the terminals 172, 173 and a second balance relay coil 177 is connected to the terminals 174, 175. The coils 176, 177 act magnetically in opposite direction to each other on a relay contact 178 engageable with fixed contacts 179 and 180. When the coil 176 is energized, the contact 178 will engage the contact 179 while when the relay coil 177 is energized, the contact 178 will engage the contact 180.

The movable contact 178 is connected to a terminal 181 arranged to be connected to one side of an alternating current supply with the other side of the supply being connected to a terminal 182. The terminal 182 is connected through relay coils 183 and 184 to the fixed contacts 179 and 180 so that energization of the relay coil 176 will result in energization of the relay coil 183 and similarly energization of the relay coil 177 will result in energization of the relay coil 184.

The relay coil 183 when energized is arranged to engage a pair of contacts 185 and 186 while disengaging a pair of contacts 187 and 188. Similarly, the relay coil 184 is arranged to engage a pair of contacts 189 and 190 while disengaging a pair of contacts 191 and 192. The contacts 185 and 186 when engaged connect the contact 179 to a movable relay contact 193 which in normal operation is engaged with a contact 194 connected to an output terminal 195. Similarly, the contacts 189 and 190 when engaged connect the relay contact 180 to a movable relay contact 196 which in normal operation is engaged with a fixed contact 197 connected to an output terminal 198. The output terminals 195 and 198 are connected to terminals of the valve control motor 39, a third terminal of the motor being connected to an output terminal 199 which is connected to the terminal 182.

In the operation of the circuit as thus far described, energization of the relay coil 176 will engage the contacts 178, 179 to cause energization of the coil 183 and engagement of the contacts 185, 186 to connect the terminal 181 to the output terminal 195. This will cause movement of the motor 39 in one direction and cause the valve 40 to open. On the other hand, if the relay 177 is energized, it will cause the terminal 181 to be connected to the terminal 198 to actuate the motor 39 in a reverse direction and cause the valve 40 to close.

The contacts 193, 194 are normally maintained in engagement by energization of a relay coil 200 while the contacts 196 and 197 are normally maintained in engagement by energization of a relay coil 201. The relay coil 200 is connected between the terminal 181 and a terminal 202 which is connected through a limit switch 203 to the terminal of the motor which is connected to the terminal 199 in turn connected to the terminal 182. The limit switch 203 is normally closed so that the relay coil 200 is normally energized to engage contacts 193 and 194. However, when the valve 40 is moved to a fully open position the limit switch 203 will open to deenergize the relay coil 200 and disengage the contracts 193, 194 to prevent further energization of the valve motor 39 in a valve-opening direction.

The relay coil 201 is connected in a similar manner between the terminal 181 and a terminal 204 which is connected through a limit switch 205 to the terminal 199. When the valve 40 is moved to a fully closed position, the limit switch 205 will open to deenergize the coil 201 and disengage the contacts 196, 197 to prevent further energization of the valve motor 39 in a valve-closing direction.

Indicator lights are provided to indicate the operation of the circuit. In particular, a lamp 206 is connected in series with the contacts 187, 188 and 191, 192 between the terminals 181 and 182. The lamp 206 will thus be energized whenever the contact 178 is in a balanced condition.

A lamp 207 is connected between the contact 186 and the terminal 182 while a lamp 208 is connected between the contact 190 and the terminal 182. When the relay coils 176 and 183 are energized to cause the valve 40 to open, the lamp 207 will be energized to indicate that the valve is being opened and similarly, the lamp 208 is energized to indicate that the valve is being closed.

A lamp 209 is connected between the terminal 182 and a relay contact 210 which is engaged by the contact 193 when the relay coil 200 is deenergized. A lamp 211 is similarly connected between the terminal 182 and a contact 212 which is engaged by the contact 196 when the relay coil 201 is deenergized.

The lamp 209 thus indicates that the valve is in a fully open position while the lamp 211 indicates that the valve 40 is in a fully closed position. This is important with respect to the operation of the illustrated system in which the valve 40 controls only a small portion of the total water, with the main supply of water being controlled by the valve 43. In particular, energization of the lamp 209 indicates that the valve 40 is fully open and yet that insufficient water is being supplied. Accordingly, if the lamp 209 should be energized, and particularly if it is energized for any extended period of time, the valve 43 should be adjusted to supply additional water. On the other hand, if the lamp 211 is energized, the valve 43 should be adjusted to reduce the amount of water. A pair of power input terminals 213 and 214 are connected through an on-off switch 215 to a primary winding 216 of a transformer 217 and also to terminals 218 and 219 which are connected to the terminals 169 and 170 of the phase sensitive detector 37. The input terminals 213 and 214 are connected to a source of alternating current such as a source of 60 cycle 120 volt power.

The transformer 217 has a secondary winding 220 which is directly connected to terminals 221 and 222 connected to terminals 165 and 168 of the phase sensitive detector 37 to apply power thereto.

The transformer secondary 220 is also connected to a rectifier circuit to supply a B+ voltage to the amplifier 36. In particular, the secondary winding 220 has a center tap 223 connected to ground and the end terminals of the secondary winding 220 are connected through rectifiers 224 and 225 to a circuit point 226 which is connected to an output terminal 227 through series resistors 228, 229 and 230 of a smoothing filter which also includes capacitors 231, 232 and 233 connected to ground. At the terminal 227 there is developed a relatively high positive potential with respect to ground, and the terminal 227 is connected to the B+ terminal 111 of the amplifier 36.

Another secondary winding 234 of the transformer 217 is directly connected to output terminals 235 and 236 which are connected to terminals 75 and 76 of the sensor control and balance circuit 35.

The secondary winding 234 is also connected to a bridge rectifier circuit comprising rectifiers 237 which is connected between ground and an output terminal 238 through a filter circuit comprising a series rheostat 239 and shunt capacitors 240 and 241. The terminal 238 is connected to the terminal 143 of the amplifier circuit 36 to supply direct current power to heat the heaters of the amplifier tubes.

The transformer 217 has a third secondary winding 242 which is connected between ground and a terminal 243 which is connected to a terminal 244 of the phase sensitive detector 37 to supply power to heaters 245 and 246 of the triodes 146 and 147. The secondary winding 243 may also be connected to a pilot lamp 247.

It should be noted that a ground terminal 248 of the power supply is connected to a ground terminal 249 of the phase detector.

*Summary of Operation*

Clay is fed to the pug mill 11 from a chute 12 with the main portion of water being supplied through a nozzle 13. The clay and water are throughly mixed in the pug mill by the knives 14 on shafts 15 and 16, and the clay is fed from the pug mill by sealing augers 28 and 29 to pass through sealing dies 22 and 23 into a vacuum chamber 19 from which the clay is fed by an auger 20 through an extrusion die 21.

The sensor devices 30–33 respond to variations in the consistency of the clay and by means of the differential transformers there is developed at the terminals 85 and 86 of the sensor control and balance circuit 35 an alternating current signal which is equal to zero when the average consistency of the clay at the devices 30–33 is at a preset value but which increases in magnitude as the average consistency varies from the preset value, the phase of the voltage being dependent upon whether the consistency increases or decreases.

The output of the sensor control and balance circuit is amplified by an amplifier 36 and applied to a phase sensitive detector 37 which is connected to a valve control circuit 38. The valve control circuit 38 functions to control a motor 39 to either open or close a valve 40 which is used to control the flow of water to an auxiliary nozzle 41 supplying a small portion of the total amount of water. If the consistency of the clay is less than the desired value, the valve 40 is moved toward closed position to decrease the amount of water and conversely if the consistency is greater than the desired value, the valve 40 is moved toward open position to increase the amount of water.

In the event the valve 40 is moved to a fully closed position and the consistency of the clay remains less than the desired value, a lamp 211 (FIG. 6) is energized to indicate to the operator that the valve 43 should be moved toward closed position to decrease the amount of water. Similarly, if the valve 40 is moved to a fully open position without reducing the consistency to the desired value, a lamp 209 is energized to indicate to the operator that the valve 43 should be moved toward its open position to increase the amount of water.

The desired consistency may be adjusted by adjustment of potentiometer contacts 77, 80, 82 and 84 as described above in connection with FIGURE 3.

It may be possible to locate the sensors at a point other than in the sealing dies as illustrated. However, the location in the sealing dies is preferred in that the velocity of flow of the clay is substantially constant at this point. In order to obtain an accurate indication of consistency with the sensor devices, it is necessary that the velocity of flow be constant or if it is not constant, that a compensating factor be introduced. A further advantage of the illustrated location of the sensor devices is that they are relatively close to the controlled water-supply nozzle 41, to provide sufficiently rapid response to changes in consistency produced by changes in the controlled water-supply, and yet there is sufficient mixing of the controlled water and the clay before it reaches the sensor devices.

It will be appreciated that a type of force sensing device may be used other than the differential transformer as illustrated. However, the differential transformer is preferred because it is rugged and reliable in operation and also because, by using a phase sensitive detector, an output signal is obtained which varies in response to variations in the consistency from a preset level, and yet it is not necessary to use a direct current amplifier as would be necessary to obtain the same result with sensor devices having a direct current output.

It should be noted that each of the differential transformers is diagrammatically illustrated as having two primary coils or windings as well as two secondary coils or windings. In actual physical construction, each transformer preferably has only a single primary winding with two secondary windings. However, a transformer having two primary windings and two secondary windings may, of course, be used.

It may be connected in parallel, or in series-parallel, as well as in series as illustrated.

It will be understood that modifications and variations may be effected without departing from the spirit and scope of the novel concepts of this invention.

We claim as our invention:

1. In a machine for processing moldable material, a material receiving chamber, passage means communicating with said receiving chamber, restricted orifice means in said passage means, means for effecting movement of the material at a substantially constant velocity from said chamber through said restricted orifice means, a plurality of feeler elements at spaced points in said orifice means, means for developing signals proportional to forces exerted on said feeler elements by movement of the material from said chamber through said restricted orifice means, and means for combining said signals to produce a signal indicating the average consistency of the material.

2. In a system for measuring the consistency of a moldable material, means defining a passage for flow of the material therethrough, a sleeve smaller than said passage supported therewithin, a plunger supported in said sleeve and having an end portion projecting therefrom to prevent flow of material into said sleeve, means for effecting flow of the material through said passage toward said end portion of said plunger, and means for measuring the force exerted on said plunger.

3. In a system for measuring the consistency of a moldable material, means defining a passage for flow of the material therethrough, a sleeve smaller than said passage supported therewithin, a plunger supported in said sleeve and having an end portion projecting therefrom to prevent flow of material into said sleeve, means for effecting flow of the material through said passage toward said end portion of said plunger, and an electro-mechanical transducer within said sleeve for measuring the force exerted on said plunger by the material.

4. In a system for measuring the consistency of a moldable material, means defining a passage of flow of the material therethrough, a sleeve smaller than said passage supported therewithin, a plunger supported in said sleeve and having an end portion projecting therefrom to prevent flow of material into said sleeve, means for effecting flow of the material through said passage toward said end portion of said plunger, and a differential transformer within said sleeve for measuring the force exerted on said plunger by the material.

5. In a system for measuring the consistency of a moldable material, a support, a feeler adapted to extend into the moldable material and displaceably mounted on said support, means whereby displacement of said feeler relative to said support is opposed by a force increasing with displacement, means for effecting relative movement of the moldable material and said support to cause the material to move past the feeler to displace the same, transducer means for producing an electrical signal varying with displacement of said feeler, means for producing a reference signal, and means for combining said signals to produce an output signal having a null at a certain position of the feeler and having an effective polarity and amplitude which change as the position of the feeler is shifted from said certain position.

6. In a system for measuring the consistency of a moldable material, a support, a feeler adapted to extend into the moldable material and displaceably mounted on said support, means whereby displacement of said feeler relative to said support is opposed by a force increasing with displacement, means for effecting relative movement of the moldable material and said support to cause the material to move past the feeler to displace the same, transducer means for producing an electrical signal varying with displacement of said feeler, means for producing a reference signal, means for combining said signals to produce an output signal having a null at a certain position of the feeler and having an effective polarity and amplitude which change as the position of the feeler is shifted from said certain position, and means responsive to said output signal to control the consistency of the material.

7. In a system for measuring the consistency of a moldable material, a support, a feeler adapted to extend into the moldable material and displaceably mounted on said support, means whereby displacement of said feeler relative to said support is opposed by a force increasing with displacement, means for effecting relative movement of the moldable material and said support to cause the material to move past the feeler to displace the same, transducer means for producing an electrical signal varying with displacement of said feeler, means for producing a reference signal, means for combining said signals to produce an output signal having a null at a certain position of the feeler and having an effective polarity and amplitude which change as the position of the feeler is shifted from said certain position, and means for adjusting the reference signal relative to the signal from said transducer means to adjust the position of the feeler at which the null output occurs.

8. In a system for processing a moldable material, a moldable material supply chamber, a passage in communication with said chamber and having a throat portion of restricted area, an auger in said passage between said supply chamber and said throat portion to cause movement of the moldable material through said throat portion to be compacted uniformly therein, means for rotating said auger at a substantially constant velocity to cause movement of the moldable material through said throat portion at a substantially constant velocity, a feeler extending into said throat portion, and means for measuring the force exerted on said feeler by movement of the moldable material through said passage.

9. In a system for processing a moldable material, housing means defining a chamber for receiving the moldable material and a passage for flow of the moldable material away from said chamber, means within said chamber for compacting the moldable material to force flow of the moldable material from said chamber out through said passage and arranged to produce uniform compaction of the moldable material in at least one region within said housing means, a feeler projecting into said region of uniform compaction of said moldable material, and means for measuring the force exerted on said feeler by flow of the moldable material through said region of uniform compaction thereof.

10. In a system for measuring the consistency of a moldable material, means defining a passage for flow of the material therethrough, a sleeve smaller than said passage supported therewithin, a plunger supported in said sleeve and having an end portion projecting therefrom to prevent flow of material into said sleeve, means for effecting flow of the material through said passage toward said end portion of said plunger, a differential transformer within said sleeve including primary and secondary windings and a movable core connected to said plunger, an alternating current source connected to said primary winding, amplifier means having an input connected to said secondary winding, a phase-sensitive detector connected to said alternating current source and to the output of said amplifier, and means responsive to the output of said phase-sensitive detector for controlling the consistency of the material.

11. In a control system for a moldable material processing system including housing means defining a chamber for receiving the moldable material and a passage for flow of the moldable material away from said chamber, and means within said chamber for compacting the moldable material to force flow of the moldable material from said chamber out through said passage and arranged to produce uniform compaction of the moldable material in at least one region within said housing means, a support, a feeler displaceably mounted on said support and adapted to extend into said region of uniform compaction of the moldable material, means whereby displacement of said feeler relative to said support is opposed by a force increasing with displacement, transducer means for producing an electrical signal varying with displacement of said feeler, means for producing a reference signal, and means for combining said signals to produce an output signal having a null at a certain position of the feeler and having an effective polarity and amplitude which change as the position of the feeler is shifted from said certain position.

12. In a control system for a moldable material processing system including housing means defining a chamber for receiving the moldable material and a passage for flow of the moldable material away from said chamber, and means within said chamber for compacting the moldable material to force flow of the moldable material from said chamber out through said passage and arranged to produce uniform compaction of the moldable material in at least one region within said housing means, a support, a feeler displaceably mounted on said support and adapted to extend into said region of uniform compaction of the moldable material, means whereby displacement of said feeler relative to said support is opposed by a force increasing with displacement, transducer means for producing an electrical signal varying with displacement of said feeler, means for producing a reference signal, means for combining said signals to produce an output signal having a null at a certain position of the feeler and having an effective polarity and amplitude which change as the position of the feeler is shifted from said certain position, and means responsive to said output signal to control the consistency of the material.

13. In a control system for a moldable material processing system including a moldable material supply chamber, a passage in communication with said chamber and having a throat portion of restricted area, an auger in said passage between said supply chamber and said throat portion to cause movement of the moldable material through said throat portion to be compacted uniformly therein, and means for rotating said auger at a substantially constant velocity to cause movement of the moldable material through said throat portion at a substantially constant velocity, a support, a feeler displaceably mounted on said support and adapted to extend into said throat portion, means whereby displacement of said feeler relative to said support is opposed by a force increasing with displacement, transducer means for producing an electrical signal varying with displacement of said feeler, means for producing a reference signal, and means for combining said signals to produce an output signal having a null at a certain position of the feeler and having an effective polarity and amplitude which change as the position of the feeler is shifted from said certain position.

14. In a control system for a moldable material processing system including a moldable material supply chamber, a passage in communication with said chamber and having a throat portion of restricted area, an auger in said passage between said supply chamber and said throat portion to cause movement of the moldable material through said throat portion to be compacted uniformly therein, and means for rotating said auger at a substantially constant velocity to cause movement of the moldable material through said throat portion at a substantially constant velocity, a support, a feeler displaceably mounted on said support and adapted to extend into said throat portion, means whereby displacement of said feeler relative to said support is opposed by a force increasing with displacement, transducer means for producing an electrical signal varying with displacement of said feeler, means for producing a reference signal, means for combining said signals to produce an output signal having a null at a certain position of the feeler and having an effective polarity and amplitude which change as the position of the feeler is shifted from said certain position, and means responsive to said output signal to control the consistency of the material.

References Cited in the file of this patent

UNITED STATES PATENTS

| | | |
|---|---|---|
| 1,413,934 | Ramsey et al. | Apr. 25, 1922 |
| 1,619,807 | Bloomfield et al. | Mar. 8, 1927 |
| 1,734,419 | Chitty | Nov. 5, 1929 |
| 1,949,534 | Doyle | Mar. 6, 1934 |
| 1,996,233 | Dariah | Apr. 2, 1935 |
| 2,017,225 | Witham | Oct. 15, 1935 |
| 2,031,018 | Thomas | Feb. 18, 1936 |
| 2,052,022 | Fisher | Aug. 25, 1936 |
| 2,192,039 | Harcourt | Feb. 27, 1940 |
| 2,364,930 | Turner | Dec. 12, 1944 |
| 2,392,662 | Griesheimer | Jan. 8, 1946 |
| 2,603,087 | Von Hortenau | July 15, 1952 |
| 2,633,016 | Millington | Mar. 31, 1953 |
| 2,846,873 | Kalle | Aug. 12, 1958 |
| 2,852,091 | Boudreaux | Sept. 16, 1958 |
| 2,869,673 | Erwin | Jan. 20, 1959 |

FOREIGN PATENTS

| | | |
|---|---|---|
| 239,223 | Great Britain | Jan. 21, 1926 |
| 745,369 | Great Britain | Feb. 22, 1956 |
| 839,703 | France | Jan. 7, 1939 |